United States Patent
Lahtinen et al.

(10) Patent No.: US 7,620,185 B2
(45) Date of Patent: Nov. 17, 2009

(54) PREVIEW OF PAYABLE BROADCASTS

(75) Inventors: Pekka Lahtinen, Helsinki (FI); Karina Terekhova, Helsinki (FI)

(73) Assignee: Nokia Corporation, Espoo (FI)

( * ) Notice: Subject to any disclaimer, the term of this patent is extended or adjusted under 35 U.S.C. 154(b) by 48 days.

(21) Appl. No.: 10/940,631

(22) Filed: Sep. 15, 2004

(65) Prior Publication Data

US 2006/0059090 A1  Mar. 16, 2006

(51) Int. Cl.
*H04L 9/00* (2006.01)
(52) U.S. Cl. .................... 380/277; 380/276; 713/163
(58) Field of Classification Search ............ 380/277, 380/201; 713/182
See application file for complete search history.

(56) References Cited

U.S. PATENT DOCUMENTS

| | | | |
|---|---|---|---|
| 2002/0170053 A1 | 11/2002 | Peterka et al. | |
| 2002/0172366 A1* | 11/2002 | Peterka et al. | 380/277 |
| 2002/0172368 A1* | 11/2002 | Peterka | 380/278 |
| 2002/0174366 A1 | 11/2002 | Peterka et al. | |
| 2003/0013492 A1 | 1/2003 | Bokhari et al. | |
| 2003/0088778 A1* | 5/2003 | Lindqvist et al. | 713/182 |
| 2003/0131353 A1 | 7/2003 | Blom et al. | |
| 2004/0028227 A1* | 2/2004 | Yu | 380/201 |
| 2004/0055011 A1 | 3/2004 | Bae et al. | |
| 2004/0056985 A1 | 3/2004 | Seong | |
| 2005/0129231 A1* | 6/2005 | Kelley et al. | 380/223 |

FOREIGN PATENT DOCUMENTS

| | | |
|---|---|---|
| EP | 0708561 A2 | 4/1996 |
| WO | 01/48658 A1 | 7/2001 |
| WO | 2004/021707 A1 | 3/2004 |
| WO | WO2005/060564 | 7/2005 |

OTHER PUBLICATIONS

The DVB Project, "DVB-H Trials Planned for Australia", http://www.dvb.org/index.php?id=10&nid=79, 1 page, Aug. 26, 2004, printed on Sep. 15, 2004.
The DVB Project, "Finnish companies join forces for a commercial pilot for mobile broadcasting services", http://www.dvb.org/index.php?id=48&nid=47, 4 pages, Dec. 15, 2003, printed on Sep. 15, 2004.

(Continued)

*Primary Examiner*—Evens J Augustin
(74) *Attorney, Agent, or Firm*—Locke Lord Bissell & Liddell

(57) ABSTRACT

Content items or portions of content items are made available for previewing according to various techniques. In some techniques, designated portions of content items are transmitted in plaintext, while the remaining portions are transmitted in encrypted form. In other techniques, an entire content item is transmitted in encrypted form. However, content keys for decrypting the content item may be transmitted in plaintext form for certain portions designated for previewing and in encrypted form for the remaining portions. Also, an entire content item may be transmitted in encrypted form. Similarly the content keys for decrypting the content item is transmitted in encrypted form. However, preview rights keys for decrypting the content keys may be transmitted. These rights keys have associated usage rules that limit their use.

28 Claims, 15 Drawing Sheets

OTHER PUBLICATIONS

The DVB Project, "DVB-H/IPDC-DVB-Handheld & IP-Datacast", http://www.dvb.org/index.php?id=278, 1 page, Jun. 9, 2004, printed on Sep. 15, 2004.

The DVB Project, "DVB H Handheld—IP broadcasting to handheld devices based on DVB-T", http://www.dvb.org/documents/white-papers/wp07.DVB-H.final.pdf, 2 pages, printed on Sep. 15, 2004.

The DVB Project, "DVB Interim Specification—IP Datacast Baseline Specification; Specification of Interface I_MT", http://www.dvb.org/documents/a080.pdf, 37 pages, Apr. 2004, printed on Sep. 15, 2004.

* cited by examiner

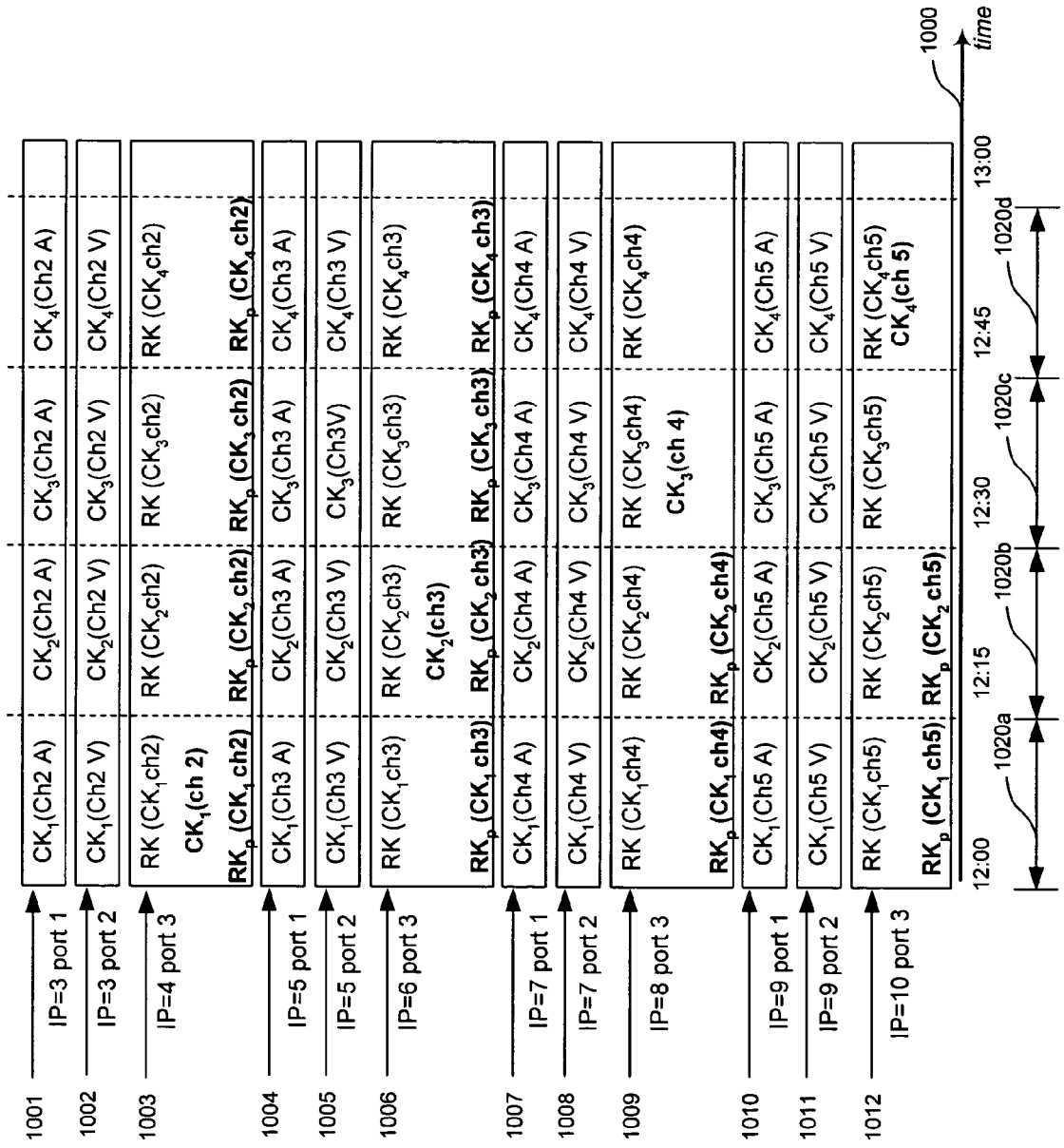

PREVIEW OF PAYABLE BROADCASTS

FIELD OF THE INVENTION

The present invention relates to wireless communications. More particularly, the present invention relates to techniques delivering previews of payable transmissions.

BACKGROUND OF THE INVENTION

In digital broadcast systems, streaming content, such as television programming, is transmitted to consumers in encrypted form. To view this content, consumers must purchase rights to do so. In return, paying consumers receive one or more keys to decrypt the content upon reception.

Examples of such systems include direct video broadcast (DVB) systems, such as DVB-T and DVB-C networks, where certain television programs may be broadcast in encrypted form and can be viewed for payment. The term conditional access (CA) is often used to describe the encryption/decryption solution. This solution typically involves a set top box (STB) at a consumer's premises that is equipped with a vendor-specific CA module. This CA module stores the keys and performs the decryption process.

IP datacast (IPDC) over DVB-H (i.e. digital video broadcast to handheld devices) network is a new system that provides for the broadcast of various types of content using Internet Protocol (IP) transmissions across DVB transport systems. A DVB-H network has a fixed total capacity. The channel's exact capacity depends on the employed modulation parameters. For DVB-H, capacity is typically between 5 and 15 megabits per second (Mbps) for mobile and indoor reception. In DVB-H, this total bandwidth is divided into a number of timeslice channels that each have a static bit rate to facilitate mobility and handover.

Providers of streaming content (e.g., broadcasters of television programs) often wish to supply potential consumers with previews of the content. Thus, while an entire television program is viewable only for payment, short previews of the program may be viewed free of charge.

Providing such previews is technically challenging because such content streams are typically broadcast encrypted. Current technical challenges involve broadcasting an unencrypted (or plaintext) content stream without duplicating the required broadcast bandwidth and limiting the preview to short time periods while giving consumers the chance to freely pick the time of their preview.

SUMMARY OF THE INVENTION

The present invention provides techniques for delivering previews of content. Accordingly, in a aspect of the present invention, a system and method designate one or more portions of a content item for previewing; generate an electronic services guide (ESG) having information regarding the one or more designated portions; transmit the one or more designated portions in a plaintext form across a network; and transmit the remaining portions of the content item in an encrypted form across the network.

In a further aspect of the present invention, a method and system designate one or more portions of a content item for previewing; generate an electronic services guide (ESG) having information regarding the one or more designated portions; transmit the content item in an encrypted form across a network; transmit a plurality of content keys across the network in an encrypted form, each of the plurality of keys for decrypting a corresponding portion of the content item; and transmit one or more of the plurality of content keys across the network in plaintext form, wherein the one or more of the plurality of keys correspond to the one or more designated portions of the content item.

In a yet a further aspect of the present invention, a method and system transmit a content item in an encrypted form across a network; transmit a plurality of content keys across the network in an first encrypted form, each of the plurality of keys for decrypting a corresponding portion of the content item; transmit one or more of the plurality of content keys across the network in a second encrypted form; transmit a subscriber rights key across the network for decrypting the plurality of content keys in the first encrypted form; and transmit a preview rights key across the network for decrypting the one or more content keys in the second encrypted form.

The present invention also provides for terminal devices. One such terminal device includes means for receiving an electronic services guide (ESG), the ESG having information regarding one or more portions of a content item that are designated for previewing; means for receiving the one or more designated portions of the content item in a plaintext form; and means for receiving the remaining portions of the content item in an encrypted form.

A further terminal device includes means for receiving an electronic services guide (ESG), the ESG having information regarding one or more portions of a content item that are designated for previewing; means for receiving the content item in an encrypted form; and means for receiving one or more content keys in plaintext form, wherein the one or more keys correspond to the one or more designated portions of the content item.

Still a further terminal device includes means for receiving a content item in an encrypted form; means for receiving a plurality of content keys in an encrypted form, each of the plurality of keys for decrypting a corresponding portion of the content item; and means for receiving a preview rights key across the network for decrypting the one or more content keys in the second encrypted form.

The present invention also provides systems having multiple servers. In one such system including two servers, a first server provides an electronic services guide (ESG) having information regarding one or more portions of a content item that are designated for previewing. A second server provides the one or more designated portions of the content item in a plaintext form and the remaining portions of the content item in an encrypted form.

Another system includes three servers. In this system, a first server provides an electronic services guide (ESG) having information regarding one or more portions of a content item that are designated for previewing. A second server provides the content item in an encrypted form. A third server provides one or more content keys in plaintext form and one or more keys in encrypted form. The one or more content keys in plaintext form are for decrypting the one or more designated portions of the content item, and the one or more content keys in encrypted form are for the remaining portions of the content item.

The present invention advantageously provides for the delivery of content previews without in a manner that efficiently utilizes communications resources and bandwidth.

Further features and advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIGS. 9, 10A, and 10B are diagrams of exemplary transmission schemes according to aspects of the present invention;

DETAILED DESCRIPTION OF THE PREFERRED EMBODIMENTS

I. Operational Environment

Figure 1:
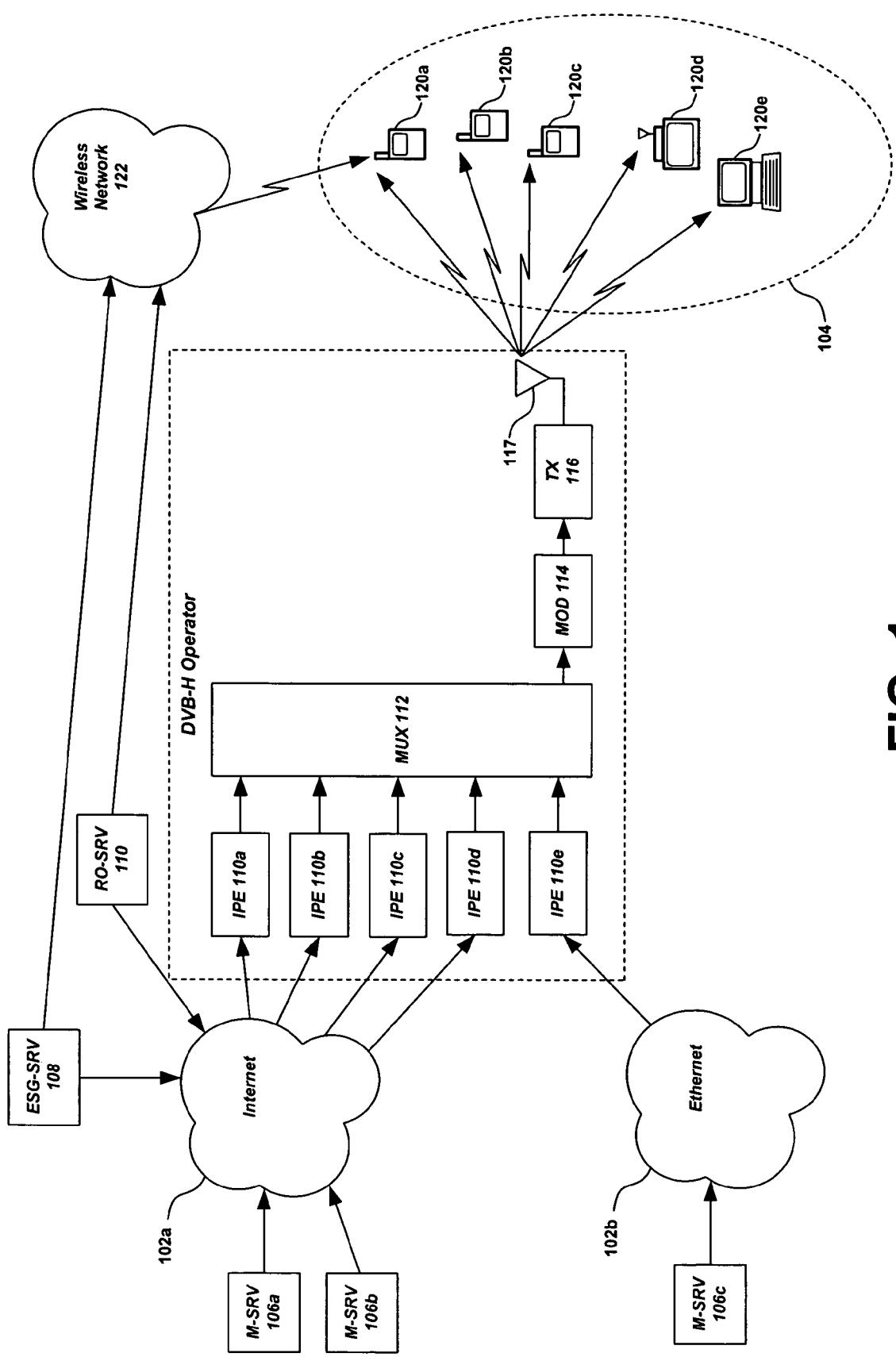
FIG. 1 is a diagram of an exemplary operational environment.

FIG. 1 is a diagram of a broadcast environment in which the present invention may be employed. This environment involves multiple packet-based networks 102 and a broadcast network 104.

Packet-based networks 102 perform communications through the exchange of packets, such as Internet Protocol (IP) packets, through various protocols. Accordingly, networks 102 may be of various types. For instance, the environment shown in FIG. 1 includes a packet-based network 102a that is the Internet, and a packet-based network 102b that is a local area network (such as an Ethernet).

Broadcast network 104 provides point-to-multipoint type communications over a broadcast transmission medium. Each broadcast network may employ various wired or wireless technologies. For instance, FIG. 1 shows a broadcast network 104 as a DVB-H network. However, broadcast network 104 may be a DVB-T network, a cable network such as a Data Over Cable Service Interface Specification (DOCSIS) network, or the like.

The environment of FIG. 1 includes a plurality of multimedia streaming servers (M-SRVs) 106 that are coupled to one or more of packet-based networks 102. Servers 106 produce multimedia streams containing content such as audio, video, and/or text. For example, a particular server 106 may provide multiple audio streams via multiple audio channels. In addition, this server may provide video streams and/or text streams that are synchronized with corresponding audio streams.

In addition, the environment of FIG. 1 includes an electronic service guide (ESG) server (ESG-SRV) 108 that provides ESG information to terminals in network 104. An ESG is a set of metadata that is used to describe "programs", sessions, services and other information that a broadcast service provides. An ESG provides device users with information regarding, for example, programs, services, costs, and the like. An ESG also provides a device with information so that the device may receive the services.

FIG. 1 also includes a rights object server (RO-SRV) 110 that provides rights objects to terminal devices. These rights objects contain information, such as keys (referred to herein as rights keys), that allow for the decryption of content keys. This decryption of content keys provides for the consumption of content items, such as multimedia content streams from sources, such as M-SRVs 106. In addition to rights keys, rights objects may contain rules which specify the manner in which rights keys may be used. As described herein, different types of rights objects (e.g., preview ROs or subscriber ROs) may be delivered to terminal devices.

Each of servers 106 may distribute their streams to one or more destinations across packet-based networks 102. Such distribution may involve IP multicasting protocols. The combined bit rate of all streams produced by a particular server typically varies over time. In embodiments, these variations are around a stable average.

FIG. 1 shows multiple IP encapsulators (IPEs) 110 that are each coupled to one or more of packet-based networks 102. IPEs 110 receive packet streams produced by servers and operate as gateways between packet-based networks 102 and broadcast network 104. In particular, IPEs 110 convert received packet streams into broadcast network transport streams (e.g., DVB-H transport streams).

For broadcast network 104, FIG. 1 shows a multiplexer (MUX) 112, a modulator (MOD) 114, and a transmitter (TX) 116. MUX 112 is coupled to each IPE 110, while MOD 114 is coupled between MUX 112 and TX 116.

MUX 112 combines transport streams from one or more different sources (such as different IPEs 110) into a single transmission stream. This single stream is sent to MOD 114, which converts the transmission stream from a digital representation into a radio frequency (RF) signal. TX 116 amplifies the RF signal and transmits it (or broadcasts) the signal to the devices in broadcast network 104 via an antenna 117.

FIG. 1 shows that broadcast network 104 includes one or more receivers (RXs) 120, which are also referred to herein as terminal devices. These devices receive and process RF signals transmitted by TXs 116. This allows the devices to present the services (e.g., streams) conveyed by the RF signals to its end-users. Devices 120 may include portable handheld devices (such as wireless telephones and PDAs), as well as televisions, set-top boxes, and personal computers.

In addition, FIG. 1 shows a wireless network 122. This network may be, for example, a cellular communications network or a short-range wireless communications network. Examples of short-range communications networks include Bluetooth, wireless local area networks (WLANs), and radio frequency identification (RFID) networks. As shown in FIG. 1, various servers may deliver information to terminal devices across network 122. Examples of such information include rights objects and/or rights keys from RO-SRV 110, and ESGs from ESG-SRV 108.

The present invention may be employed in a IP datacast (IPDC) system over DVB-H (i.e., digital video broadcast to handheld devices). However, the scope of the present invention covers other systems as well.

Figure 2:
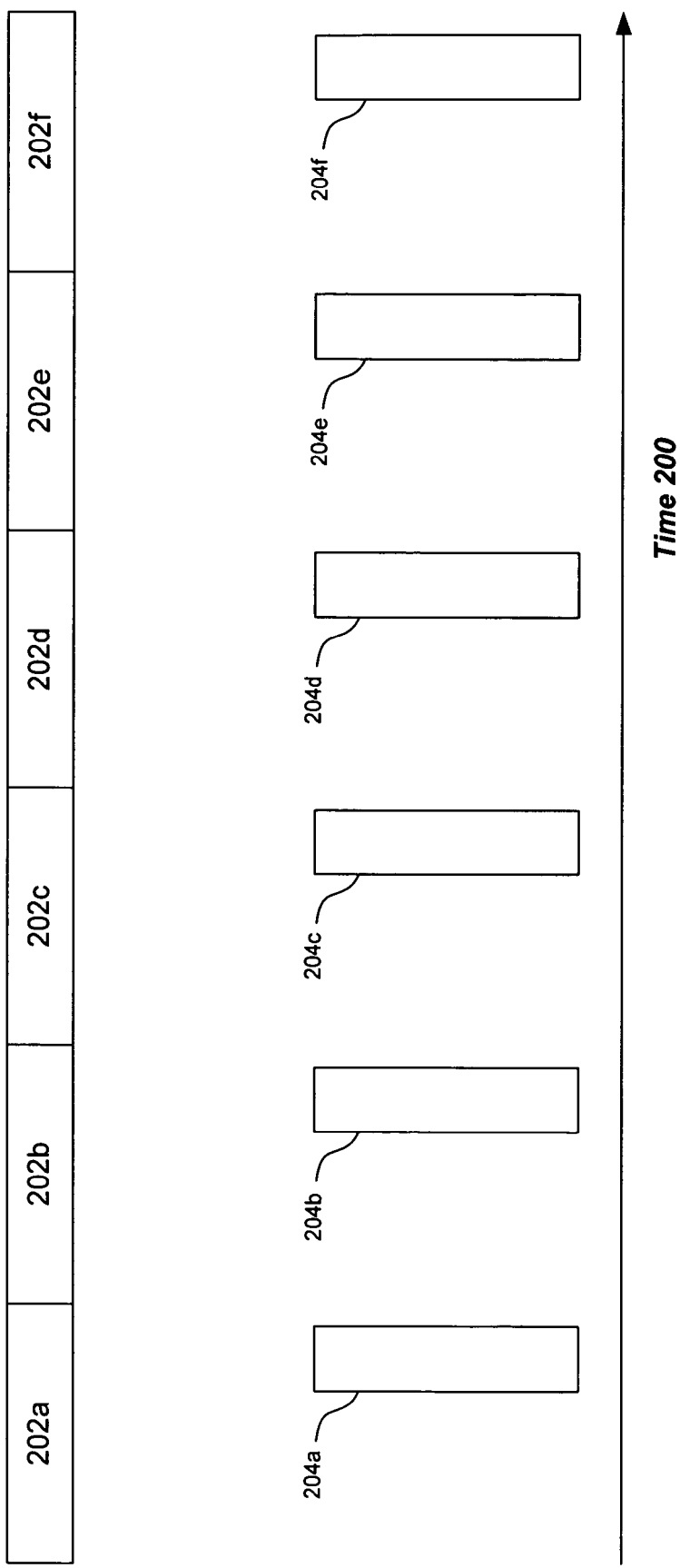
FIG. 2 is a diagram of a timeslicing technique.

FIG. 2 is a diagram showing a timesslicing technique, that may be employed in broadcast systems, such as DVB-H networks. As shown in FIG. 2, a plurality of time slots 202 exist in succession. A service, such as a streaming video program (e.g., an ice hockey game) is transmitted during these time slots. In particular, FIG. 2 shows the service starting stream at a time slot $202_1$ and ending at a time slot $202_9$.

The service stream is transmitted according to a timeslicing technique. That is, the service stream is fragmented into burst transmissions (or packets) 204, which occur in particular portions of time slots 202. These particular portions are referred to as time slices. In particular, FIG. 2 shows bursts $204_1$-$204_8$ occurring within particular time slices of slots $202_1$-$202_8$, respectively.

In embodiments, each burst 204 has a fixed duration. Also, consecutive bursts 204 are separated in time by a fixed interval. However, in further embodiments, the duration of a burst and/or the intervals between bursts may vary. Information regarding such variations may be signaled within these bursts so that the bursts can be received by the terminal devices.

As described above, bursts 204 are received by one or more terminal devices. Upon receipt, each device buffers and processes (e.g., decodes, error corrects, etc.) these bursts. As a result, content such as video and/or audio is rendered for consumption by device users.

Addresses may be assigned to timeslices. For instance, an individual timeslice may be assigned one or more Internet Protocol (IP) addresses.

II. Distribution Conventions and Notation

As described above, aspects of the present invention involve the transmission of content streams. A content program may include more than one stream. For instance, a television program may include separate audio and video streams. A description of such exemplary streams is now provided.

Let S denote a stream of IP packets. This stream is transmitted (e.g., broadcasted) in portions. These portions are also referred to herein as batches. Each batch is encrypted with a corresponding key from a series of content keys. An index, i, is used herein to denote these individual content keys. Thus, the content keys used to encrypt these batches are referred to herein as CKi (e.g., CK1, CK2, etc.).

The encrypted content stream batches are denoted herein as CKi(S) (e.g., CK1(S), CK2(S), etc.). Therefore, the content key for a particular stream typically changes throughout the duration of the corresponding program.

To decrypt stream S and present its corresponding content to a user, the terminal must obtain the content keys. These content keys may be sent to the terminal in an encrypted format. For instance, the content keys may be encrypted by a rights key, RK, and transmitted (e.g., broadcasted) to the terminal.

The rights key changes (if at all) on a less frequent basis than the content keys. In fact, the rights key may be common to multiple programs and channels. Thus, for a content stream, S, a terminal receives a stream of encrypted content and a stream of encrypted content keys. For a range of index values, the stream of encrypted content is denoted herein by CKi(S) and the stream of encrypted content keys is denoted herein by RK(CKi).

Therefore, according to this scheme, the terminal needs to obtain the rights key, RK, to decrypt the content keys CKi, and to then decrypt the content stream, S.

III. Plaintext and Encrypted Streaming Content Coordinated by ESG

As described above, the present invention provides various approaches for delivering program previews, without simultaneously transmitting content in both plaintext and normal encrypted form. One of these approaches involves switching between plaintext and encrypted broadcasting during a single program (or streaming content channel in general).

For instance, one or more predetermined time intervals (such as the first five minutes of each file or the first five minutes of each program) may be designated as preview periods.

Based on such designations, an ESG may be generated that automatically informs consumers (e.g., terminal users) of designated preview periods corresponding to particular content. Such ESGs may be directed to consumers that have not purchased the particular content. These consumers are referred to herein as previewers.

In contrast, consumers that have purchased the rights to view the content (referred to herein as subscribers) may consume (e.g., view) the content completely. Thus, based on this information in the ESG, a subscriber's terminal can seamlessly switch between decoding plaintext preview portions of the content and decoding the remaining encrypted portions.

According to an aspect of this approach, one or more preview channels may be provided. These channels combine preview periods of different channels into a continuous "channel hopping" preview program. This preview channel may be advertised in an ESG.

For example, assume a broadcaster supplies six payable channels to consumers. During each half an hour, each channel has a fixed preview period of 5 minutes, but at different times. ESG then describes a preview channel (in addition to the channels proper) combining the preview periods of different channels into a continuous programming, where the channel proper changes at 5 minute intervals.

Figure 3:
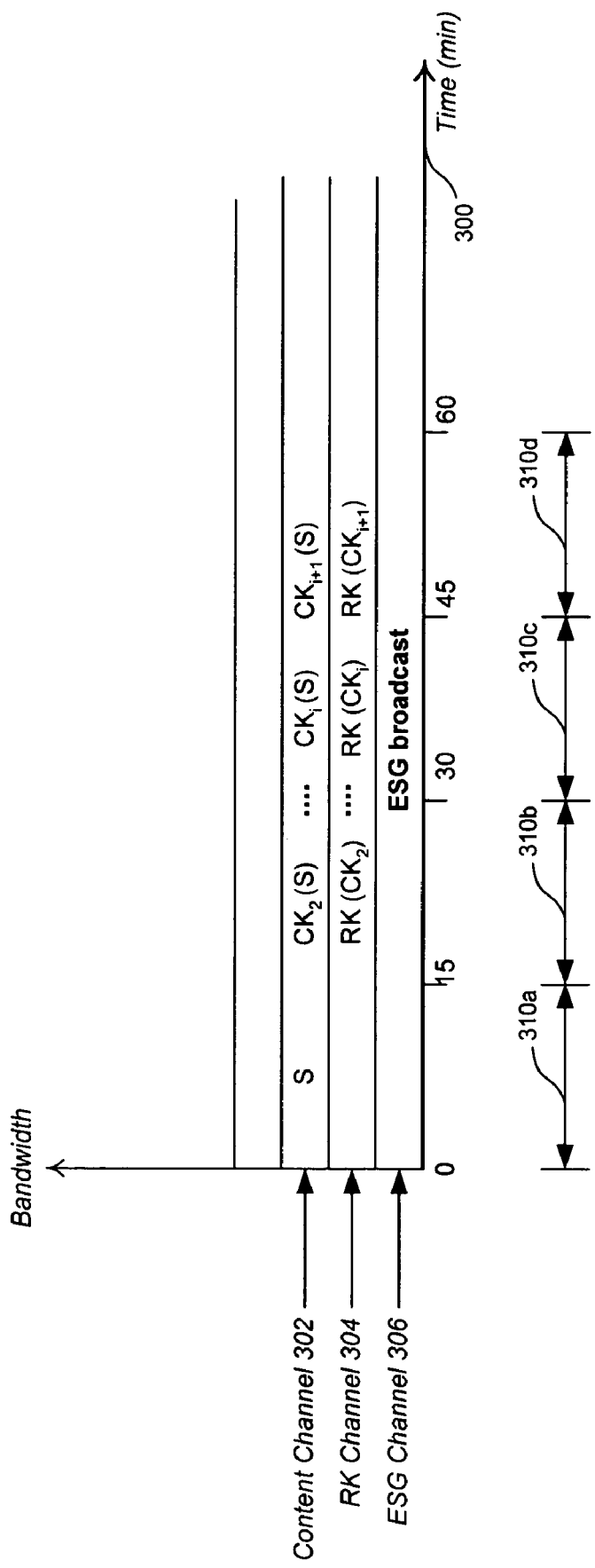
FIG. 3 is a diagram showing an example of plaintext and encrypted streaming content.

FIG. 3 is a diagram illustrating an example of this approach. In particular, FIG. 3 shows transmissions across multiple channels along a time axis 300. These channels include a content channel 302, a rights key (RK) channel 304, and a ESG channel 306.

Content, such as a program or file, is transferred across content channel 302. Content keys encrypted with a rights key is transferred across content channel 304. ESG channel 306 convey guide information, such as designated preview periods and their corresponding channels.

Several time intervals 310 exist along time axis 300. Interval 310a is designated a preview interval. Accordingly, during this interval, content, S, is transmitted in plaintext form so that previewers may obtain the content. In addition, subscribers may obtain this content by foregoing decryption. However, FIG. 3 shows that content S is encrypted by content keys, CKi, during intervals 310b-d. Therefore, only subscribers having these content keys may obtain the content during these intervals.

Figure 4:
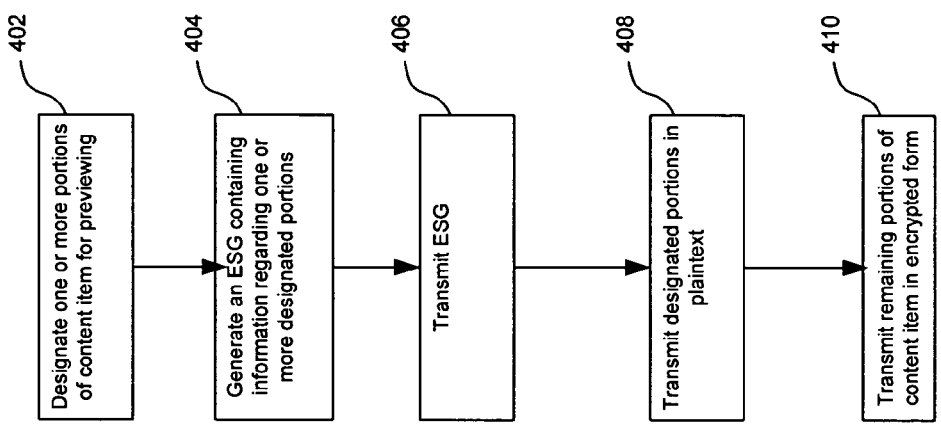
FIG. 4 is a flowchart of an operation, according to aspects of the present invention.

FIG. 4 is a flowchart showing an operation, according to an aspect of the present invention. This operation may be performed by one or more servers, such as a content server and an ESG server.

As shown in FIG. 4, the operation of FIG. 4 includes a step 402 in which one or more portions of a content item are designated for previewing. In a step 404, an ESG having information regarding the one or more designated portions is generated. This ESG may also include other information regarding the content item, such as descriptive text and channel information. In embodiments, this channel information may include network address and port information.

In a step 406, the ESG is transmitted across one or more networks. With reference to FIG. 1, this network may be DVB-H network 104. FIG. 4 shows that in a step 408, the one or more designated portions are transmitted in a plaintext (i.e. unencrypted) form. However, in step 410, the remaining portions of the content item are transmitted in an encrypted form. Thus, while previewers may consume the portions transmitted in plaintext form, only subscribers may consume the portions transmitted in encrypted form.

IV. Plaintext and Encrypted Content Keys Broadcast in Parallel

Another approach of the present invention involves transmitting plaintext content keys CKi in parallel with encrypted content keys RK(CKi). Thus, content S is always sent encrypted by content keys, CKi(S). However, for one or more predetermined previewing time intervals, the content keys are transmitted in two different forms: encrypted with a rights key (i.e., RK(CKi)) for subscribers; and in plaintext (i.e., CKi) for previewers. For times other than these predetermined interval(s), the plaintext content keys CKi are not transmitted. Therefore, at these times, only subscribers can continue obtain the content.

An example of a predetermined time interval includes ther beginning of content transmission, but up the content portion corresponding to a particular content key, CKi.

One or more preview channels may be provided, according to an aspect of this approach. These channels combine preview periods of different content channels into a continuous "channel hopping" preview program. This preview channel may be advertised in an ESG.

For example, assume a broadcaster supplies six payable channels to consumers. During each half an hour, each channel has a fixed preview period of 5 minutes, but at different times. ESG then describes a preview channel (in addition to the channels proper) combining the preview periods of different channels into a continuous programming, where the channel proper changes at 5 minute intervals.

Figure 5:
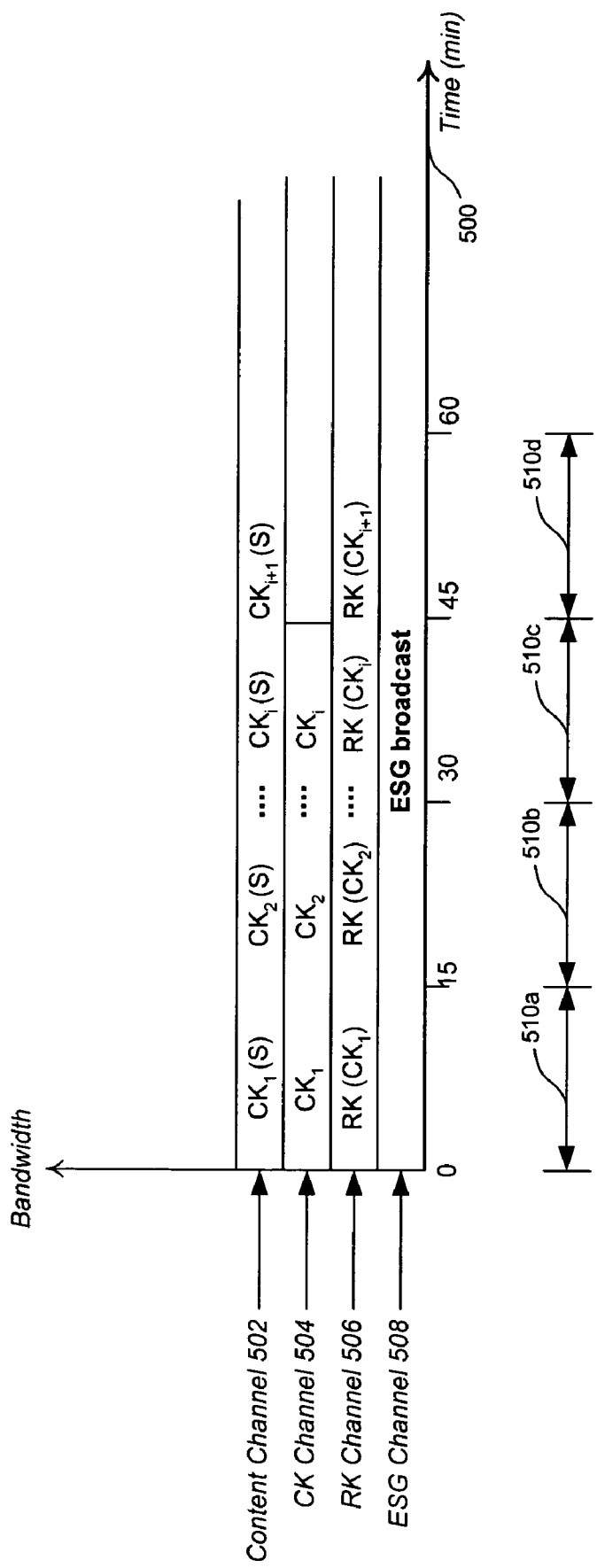
FIG. 5 is a diagram showing an example of plaintext and encrypted content keys broadcast in parallel.

FIG. 5 is a diagram illustrating an example of this approach. In particular, FIG. 5 shows transmissions across multiple channels along a time axis 500. These channels include a content channel 502, content key (CK) channel 504, a rights key (RK) channel 506, and an ESG channel 508.

As shown in FIG. 5, several time intervals 510 exist along time axis 500. Of these, intervals 510a, 510b, and 510c are designated a preview intervals. However, interval 510d (the remaining interval) is designated for subscribers only. Accordingly, during these designated preview intervals, content key channel 504 conveys corresponding content keys, CKi. However, during interval 510d, a content key is not transmitted across content key channel 504.

FIG. 5 also shows that, for all time intervals 510, content keys are transmitted in encrypted form (encrypted with a rights key, RK) across rights key channel 506. Subscribers, will be able to decrypt these keys, and consequently decrypt the content transmission across channel 502 for all time intervals.

Figure 6:
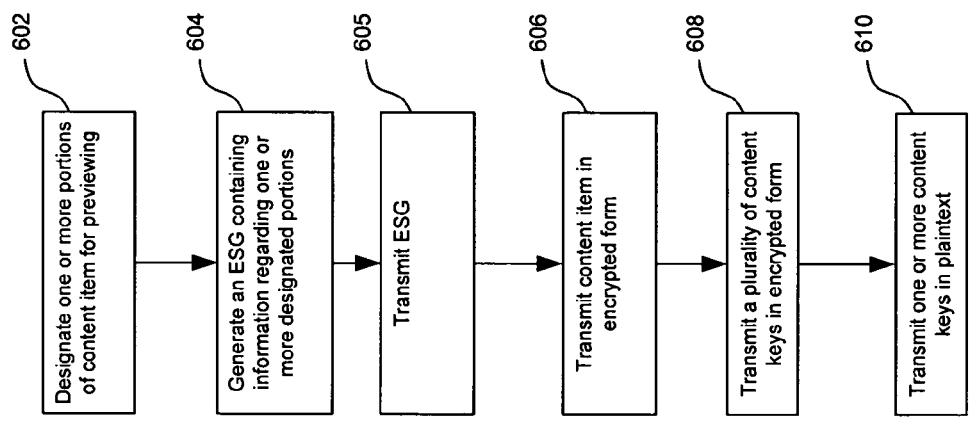
FIG. 6 is a flowchart of an operation, according to aspects of the present invention.

FIG. 6 is a flowchart showing an operation, according to an aspect of the present invention. As in the operation of FIG. 4, the operation of FIG. 6 may be performed by one or more servers, such as a content server and/or an ESG server.

The operation of FIG. 6 includes a step 602 in which one or more portions of a content item are designated for previewing. In a step 604, an ESG having information regarding the one or more designated portions is generated. This ESG may also include other information regarding the content item, such as descriptive text and channel information. In embodiments, this channel information may include network address and port information.

In a step 605, the ESG is transmitted across one or more form across one or more networks. These network(s) may include a broadcast network, such as DVB-H network 104 of FIG. 1. Also, in a step 606, the content item is transmitted across these network(s) in an encrypted form.

FIG. 6 shows that in a step 608, a plurality of content keys are transmitted in an encrypted form. Each of these content keys is for decrypting a corresponding portion of the content item. Also, in a step 610, one or more of these content keys (which in step 608 were transmitted in encrypted form) are transmitted in plaintext form. These one or more content keys in plaintext form correspond to the one or more portions of the content item designated for previewing. Accordingly, with these plaintext keys, a previewer can decrypt the portions of the content item that were designated for previewing.

V. Preview Rules in Rights Object

Rights objects (such as OMA DRM ROs) can contain various rules. For example, these rules may specify how many times the corresponding rights key can be used, and for which duration. Thus, in approaches of the present invention, previewers may be supplied with preview ROs having preview rules. These preview rules may state, for instance, that the rights keys conveyed with these ROs may be used for consuming (e.g., viewing) content for a maximum number of times, where each time has a maximum duration. An example of such rules is 10 times for 5 minutes at a time. Thus, this rules based approach offers freely selectable preview periods.

Figure 7A:
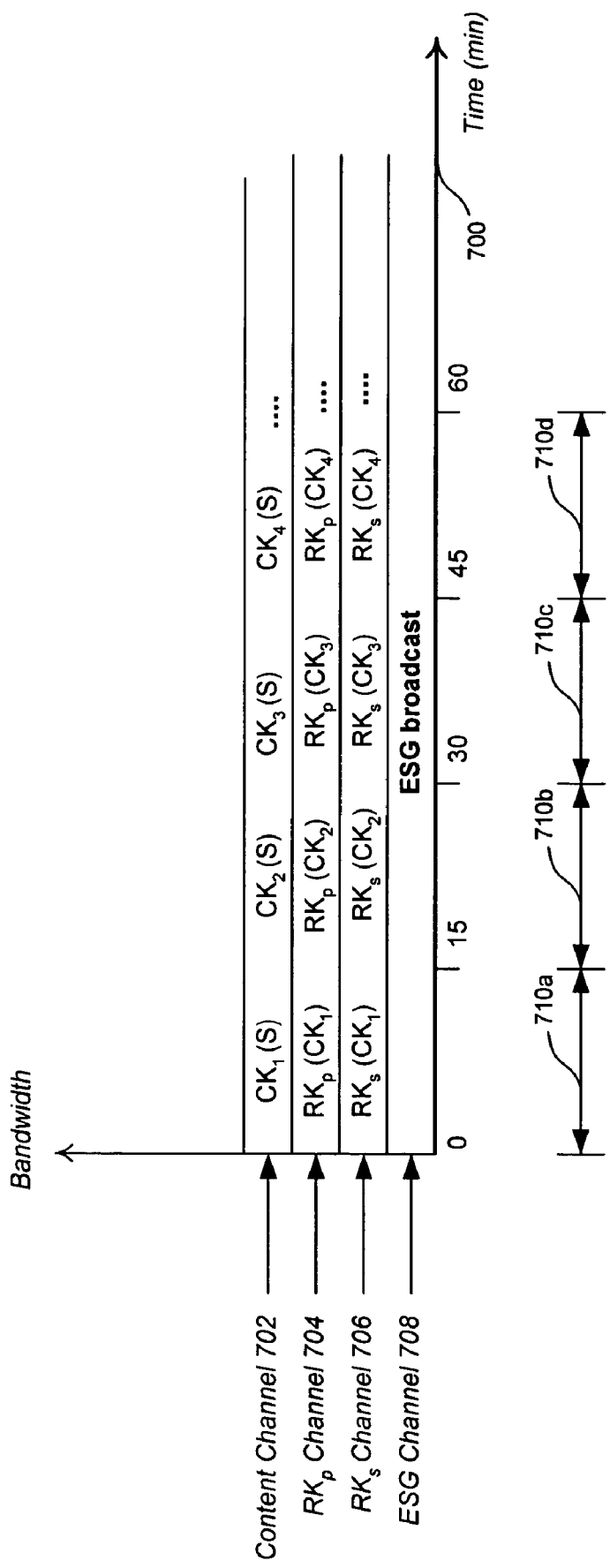
FIGS. 7A and 7B are diagrams of transmission using preview rules in rights objects.

An exemplary technique for implementing this approach involves transmitting two encrypted sequences of content keys. A first of these content key sequences is encrypted by a preview rights key RKp and denoted by RKp(CKi). RKp may have been delivered to previewers in a corresponding preview RO. A second of these content key sequences is encrypted by the "normal" rights key RKs that is provided to subscribers. This encrypted sequence of content keys is denoted herein by RKs(CKi). Thus, the overall broadcast (for one television channel) is the following:

FIG. 7A is a diagram illustrating an example of this approach. In particular, FIG. 7A shows transmissions across multiple channels along a time axis 700. These channels include a content channel 702, preview rights key channel 704, a subscriber rights key channel 706, and an ESG channel 708.

Content, such as a program or file, is transferred across content channel 702 in an encrypted form. As shown in FIG. 7A, a plurality of time intervals 710 exist. During each of these time intervals, the transmitted content is encrypted with a corresponding content key CKi. These content keys are transmitted across channels 704 and 706 in encrypted form. For instance, the content keys transmitted across channel 704 are encrypted with a preview rights key (RKp) and the content keys transmitted across channel 706 are encrypted with a subscriber rights key (RKs). As described above, the preview rights key is delivered to terminal devices in an RO having one or more usage rules that govern the manner in which previewers may preview the content.

Alternatively, ordinary generic rights key that are given to subscribers can be limited in such a way that they become preview keys. This means that the content packages need to be encrypted only once, for the encryption number (contained in the RO) is the same both to RKs and RKp, whereas the "usage rights" are different for RKs and RKp. Moreover, in this approach, the preview key RKp is specific to a channel, and not applicable across multiple channels in a sliding time window.

However, in embodiments, the preview rights key RKp may be common to multiple channels (e.g., multiple television channels), while subscribers' rights keys RKs are channel specific. Thus, a benefit to this approach is that preview rights keys RKp may be common to multiple channels. In further embodiments, each RO may contain multiple preview rights keys (RKp1, RKp2, . . . , RKpn). This allows for different preview rights keys to be governed by the same rules.

This approach provides for limited previewing as long as terminals obey the preview rules. In the context of OMA DRM, it is assumed that terminals are reliable in this sense. However, to increase the security of this approach, preview rights keys may be transmitted only during predetermined time intervals, such as the first half of each program. An example of this feature is shown in FIG. 7B.

Figure 7B:
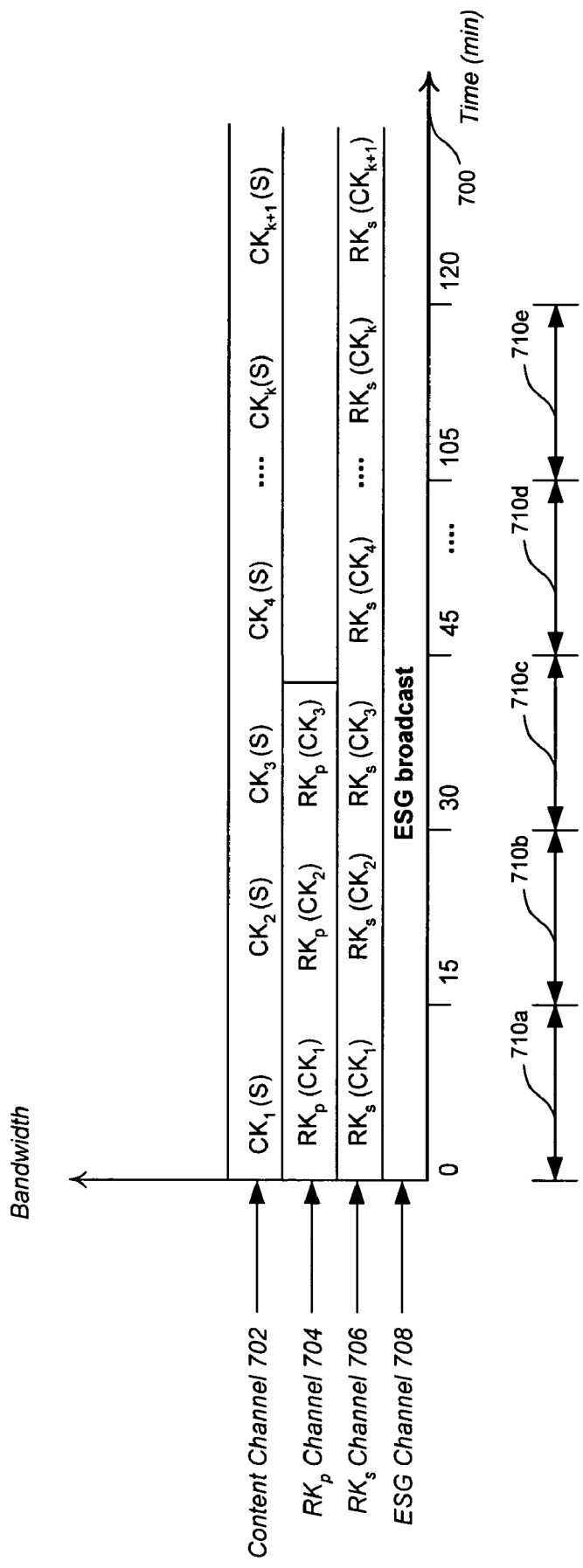

FIG. 7B is a diagram showing transmissions across channels 702-708. These transmission are similar to the ones in FIG. 7A. However, in FIG. 7B, transmissions across preview rights key channel 704 only occur for a preview period that includes time intervals 710a, 710b, and 710c.

Thus, this approach flexibly provides for tradeoffs between key safeness and free selectability of the preview periods. In further embodiments, preview ROs can also be "revoked" (i.e., made useless) and/or replaced by new ones. Thus, old preview rights key can be simply discontinued, allowing new ones to take effect. Such changes do not affect the subscribers, since they have subscribers rights keys.

Figure 8:
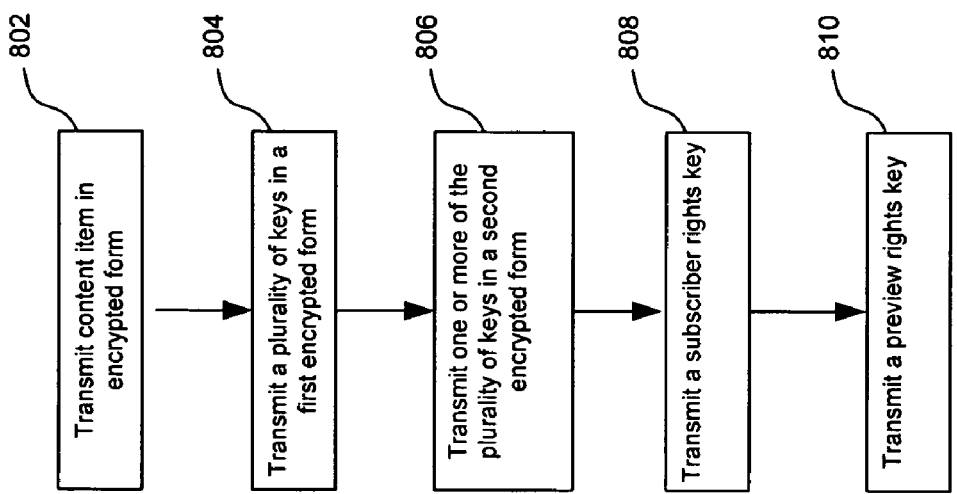
FIG. 8 is a flowchart of an operation, according to aspects of the present invention.

FIG. 8 is a flowchart showing an operation according to an aspect of the present invention. As in the operations of FIGS. 4 and 6, this operation may be performed, for example, by content and ESG servers.

The operation of FIG. 8 includes a step 802, in which a content item is transmitted in encrypted form across one or more networks. These one or more networks may include a broadcast network, such as DVB-H network 104.

In a step 804, a plurality of content keys are transmitted in an first encrypted form. Each of these keys is for decrypting a corresponding portion of the content item transmitted in step 802. In a step 806, one or more of these content keys is transmitted in a second encrypted form.

The operation of FIG. 8 includes a step 808 in which a subscriber rights key is transmitted. This key is for decrypting the plurality of content keys in the first encrypted form. Also, in a step 810, a preview rights key for decrypting the one or more content keys in the second encrypted form is transmitted. Thus, by making the preview rights key available to previewers, flexibility is provided in the selection of preview times.

VI. Secure Transmission

The approaches described above for providing previews involve the transmission of encrypted information, such as content and various keys. Exemplary implementations for the transmission of such information are now described.

The above approaches may employ a content encryption protocol, such as IPsec ESP. In this protocol, each packet of a content stream (S) that is encrypted with a content key (CK) can be abstracted as [said, CKsaid(S)], where said denotes a security association (SA) identifier and CKsaid(S) denotes content S encrypted with content key CKsaid.

In embodiments, CKsaid is given to an IPsec stack within the terminal in a security association (SA) having information that can abstracted as [said, CKsaid]. Therefore, the IPsec stack of the terminal automatically uses the said to decrypt content S with the appropriate content key as the content stream's packets are received.

Content items may include multiple streams. For instance, a television program may include separate audio and video streams. An exemplary television program is denoted herein as [S,S]=[audio, video]=[A, V]. In embodiments, such audio and video streams may be transmitted to the same IP address, but to different ports. Moreover, a different destination IP address is used to transmit security associations (SAs) as packets encrypted above the IPsec stack layer. In IPDC implementations, a next higher IP address may be used so that the SAs are broadcast in the same IPDC burst as the content.

Such SAs contain information, which may be abstracted as [said, rkid, RKrkid(CKsaid)]. In this abstraction, rkid is an identifier of a rights key (RKrkid) in plaintext. RKrkid(CKsaid) is the content key, CKsaid, encrypted by RKrkid. In approaches where content keys are transmitted in plaintext, corresponding SAs are transmitted as [said, "none", CKsaid]. With reference to the examples described herein, CKsaid is an instantiation of CKi. In approaches that employ encrypted content keys, terminals may decrypt CKsaid with RK and then compute the SA.

Terminal devices may provide SAs to their IPsec stack for decrypting content streams, such as audio stream A and video stream V. In embodiments, SA packets may be encrypted above the IPsec. This means that they are plaintext from the IPsec stack perspective, and then decrypted by a DRM mechanism.

When a terminal "knows" a rights key RK, it is able to compute content key CKi from encrypted content key RK(CKi). Terminals may obtain rights keys (RKs) in various ways. As described above, rights keys may be obtained in rights objects (ROs) along with various rules.

Digital rights management (DRM) systems, such as OMA DRM 2.0, may be used for the distribution of such ROs. Such systems may involve RO purchase channels, allowing ROs to be obtained through e-commerce transactions. Terminals may include a DRM client. Within this client (and nowhere else) the terminals receive ROs. The ROs may include information, such as a rights key identifier and its corresponding rights key (denoted as [rkid, RKrkid]).

The DRM client never reveals RKrkid. However, when presented with the encrypted data for an SA (i.e., [. . . , rkid, RKrkid(CKsaid)]), the DRM client internally matches rkid and uses RKrkid to decrypt CKsaid. The DRM client then makes CKsaid available to the rest of the terminal (e.g., the terminal's software).

VII. Transmission Examples

Figure 9:
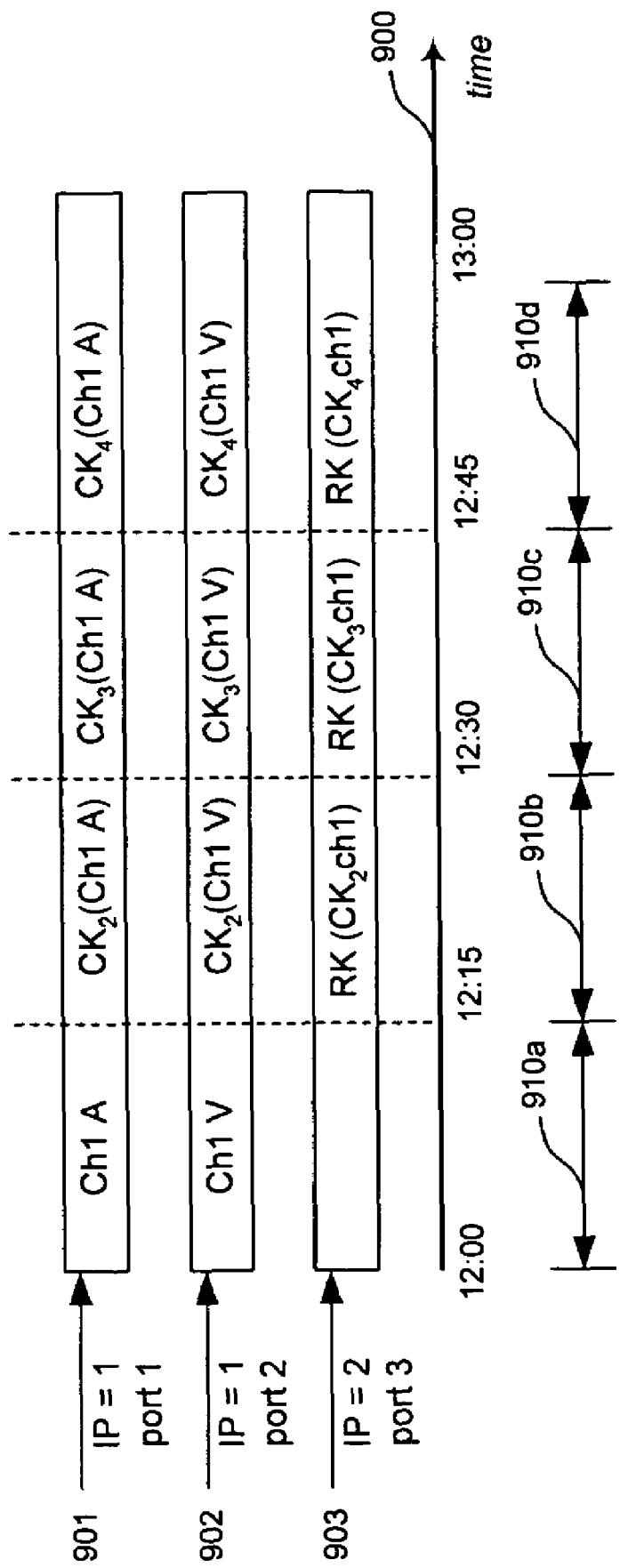
Figure 10A:
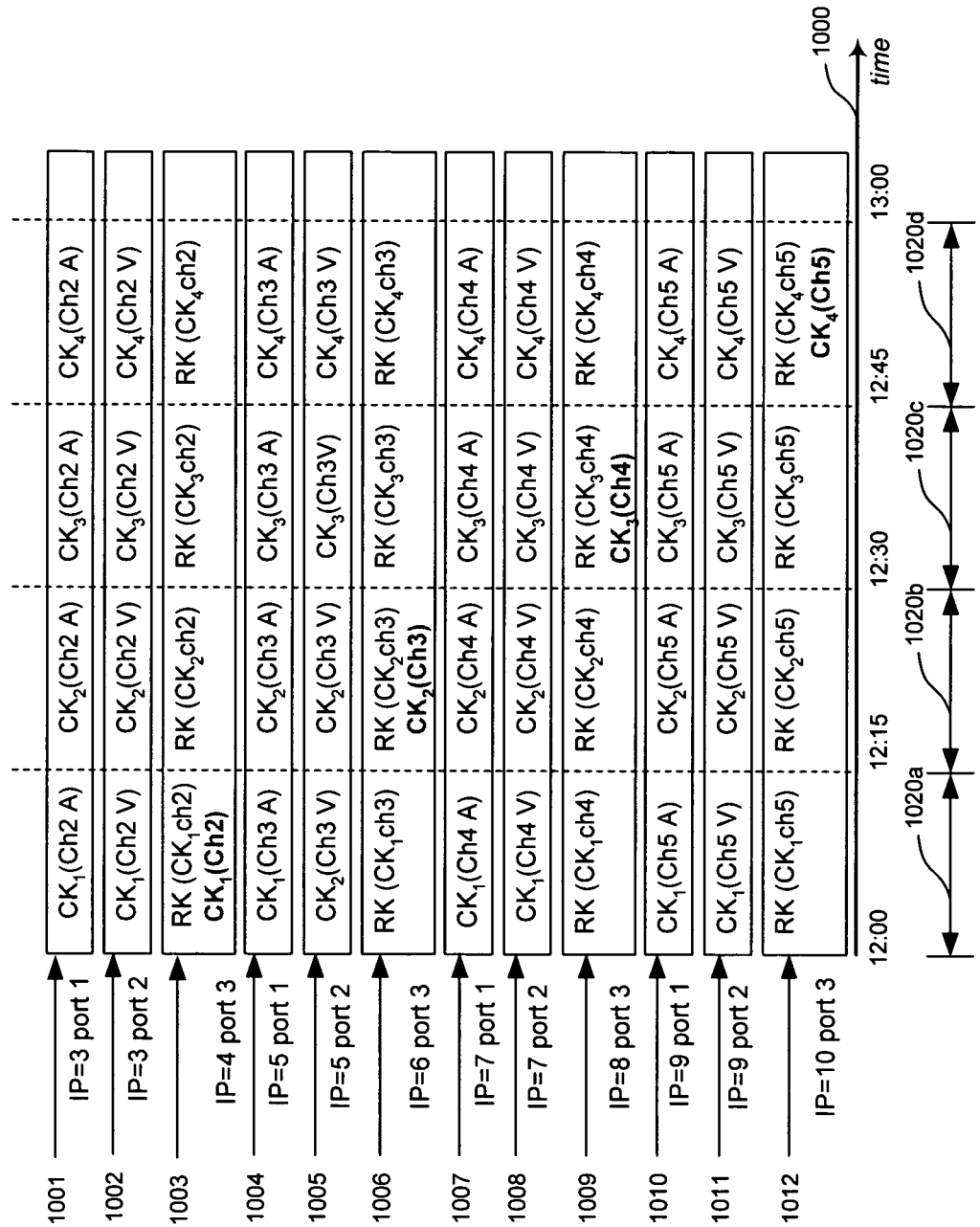
Figure 11:
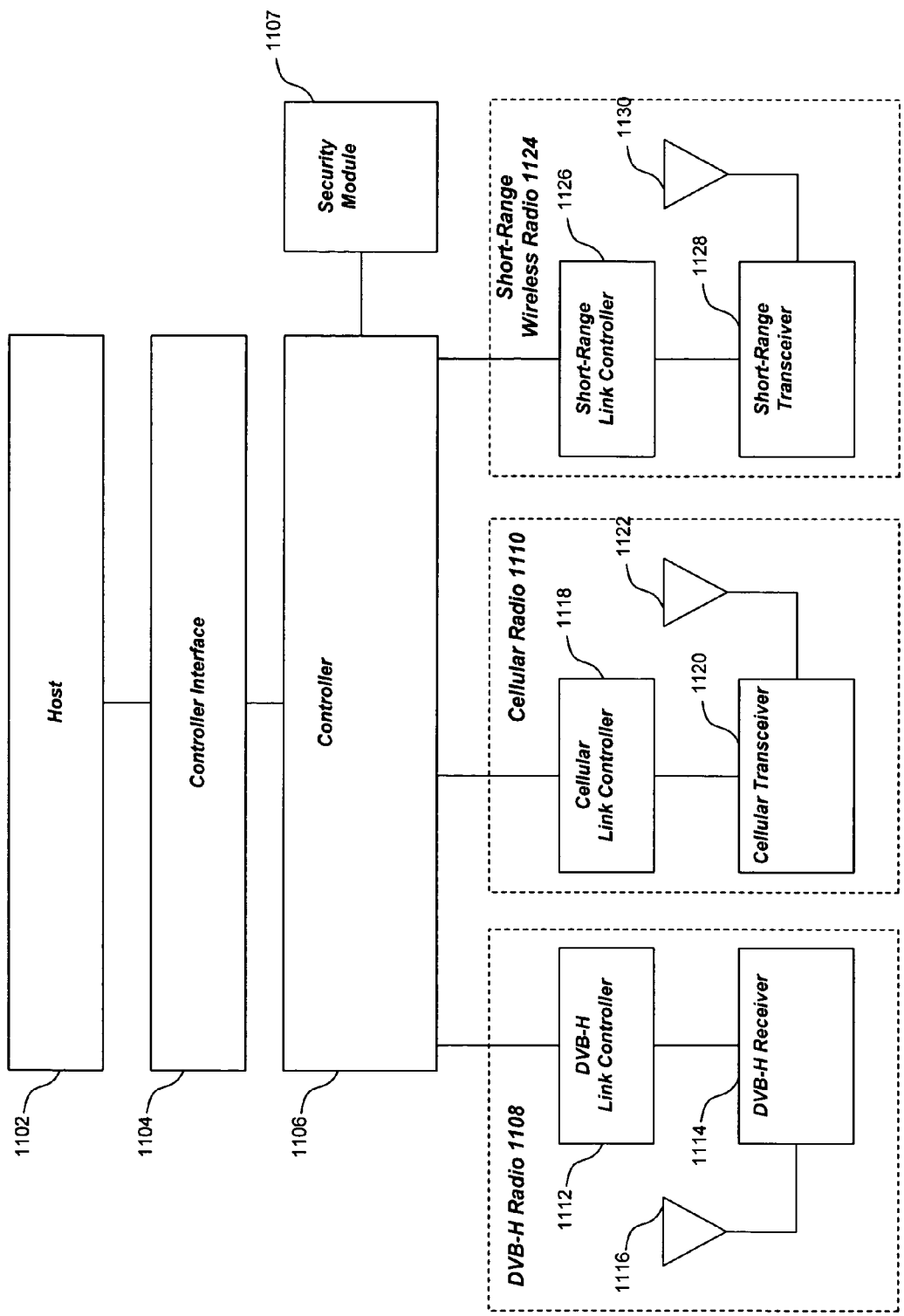
FIG. 11 is a diagram of an exemplary terminal device architecture.

FIGS. 9-11 illustrate further examples of transmissions involving previews according to aspects of the present invention. In these examples, content key simultaneously change at 15 minute intervals. For instance, FIG. 9 shows such time intervals 910 placed along a time axis 900. FIG. 9 further shows transmissions associated with a channel ch1 in subchannels 901, 902, and 903. These subchannels are each designated by IP address and port. However, other designation techniques may be employed.

For one hour of channel ch1 (shown in FIG. 9 as being between 12:00 to 13:00), we have the following broadcast to IP addresses (say 1 and 2) and ports (say 1 for audio, 2 for video, and 3 for content keys):

Thus channel ch1 sends its audio stream Ach1 and its video stream Vch1 in plaintext for the first 15 minutes. However, subsequent audio and video transmissions are encrypted with content keys. Three such content keys are shown in FIG. 9: CK2ch1, CK3ch1, and CK4ch1.

Consumers are informed that the first 15 minutes constitute a fixed preview period. This may be done through an ESG. An example of such an ESG, which describes channel ch1 (or the current program on it) between 12:00 and 13:00 is provided below in Table 1.

TABLE 1

| channel = ch1 | time = 12:00 to 12:15 | audio: IP = 1 port = 1 plaintext<br>video: IP = 1 port = 2 plaintext |
|---|---|---|
| | time = 12:15 to 13:00 | audio: IP = 1 port = 1 keys on IP = 2 port = 3<br>video: IP = 1 port = 2 keys on IP = 2 port = 3 |

A subscriber that has the RO containing RKch1s, may select ch1 (or a program on it) from the ESG. This selection instructs the terminal to receive audio and video from the given IP address and ports. From 12:00 to 12:15, the terminal does not apply content keys to receive the ch1 transmissions. However at 12:15, the terminal automatically switches to also receiving the content keys from subchannel 903. This automatic switching is based on information received in the ESG.

The received content keys are decrypted by the DRM client within the terminal and handed to the terminal's IPsec stack. The IPsec stack decrypts the audio and video streams of subchannels 901 and 902.

Meanwhile, a previewer can preview channel ch1 from 12:00 until 12:15. At that time the previewer's terminal observes that it does not have RKch1s required for decrypting RKch1s (CK2ch1). When this occurs, the terminal may suggest that the previewer subscribe to the channel to continue viewing.

Hence, to summarize, FIG. 9 provides an example of a server-end defining content protection in such a way that a free preview window exists in the content stream. During this preview window, both subscribers and previewers receive content at their terminals in plain unencrypted form.

After this preview window is over, previewers can no longer consume any content. However, subscriber terminals (based on information from an ESG) start receiving the encrypted portion of the content and decrypting it with a rights key that is available in the terminal.

FIG. 10 provides an example in which multiple channels can be previewed in such a way that each individual channel can be watched for 15 minutes of each hour, at different times. Thus these channels together constitute a preview channel where the channel proper changes at 15 minute intervals. FIG. 10 shows 15 minute time intervals 1020 placed along a time axis 1000. These intervals occur between the hours of 12:00 and 13:00.

As shown in FIG. 10, channels ch2 through ch5 each include 3 subchannels, as follows: channel ch2 includes subchannels 1001, 1002, and 1003; channel ch3 includes subchannels 1004, 1005, and 1006; channel ch4 includes subchannels 1007, 1008, and 1009; and channel ch5 includes subchannels 1010, 1011, and 1012. These subchannels are each designated by IP address and port. However, other designation techniques may be employed.

For each channel shown in FIG. 10, the content keys are broadcast in plaintext for 15 minutes preview periods. These preview periods are from 12:00 to 12:15 for channel ch2, from 12:15 to 12:30 for channel ch3, from 12:30 to 12:45 for channel ch4, and from 12:45 to 13:00 for channel ch5. Previewers cannot preview a particular channel outside of its preview period. However, subscribers holding the rights keys can.

An ESG that describes the preview features of FIG. 10 may contain the information provided below in Table 2.

TABLE 2

| channel = ch2 | time = 12:00 to 13:00 | audio: IP = 3 port = 1 keys on IP = 4 port = 3<br>video: IP = 3 port = 2 keys on IP = 4 port = 3 |
|---|---|---|
| channel = ch3 | time = 12:00 to 13:00 | audio: IP = 5 port = 1 keys on IP = 6 port = 3<br>video: IP = 5 port = 2 keys on IP = 6 port = 3 |
| channel = ch4 | time = 12:00 to 13:00 | audio: IP = 7 port = 1 keys on IP = 8 port = 3<br>video: IP = 7 port = 2 keys on IP = 8 port = 3 |
| channel = ch5 | time = 12:00 to 13:00 | audio: IP = 9 port = 1 keys on IP = 10 port = 3<br>video: IP = 9 port = 2 keys on IP = 10 port = 3 |
| channel = preview | time = 12:00 to 12:15 | audio: IP = 3 port = 1 keys on IP = 4 port = 3<br>video: IP = 3 port = 2 keys on IP = 4 port = 3 |
| | time = 12:15 to 12:30 | audio: IP = 5 port = 1 keys on IP = 6 port = 3<br>video: IP = 5 port = 2 keys on IP = 6 port = 3 |
| | time = 12:30 to 12:45 | audio: IP = 7 port = 1 keys on IP = 8 port = 3<br>video: IP = 7 port = 2 keys on IP = 8 port = 3 |
| | time = 12:45 to 13:00 | audio: IP = 9 port = 1 keys on IP = 10 port = 3<br>video: IP = 9 port = 2 keys on IP = 10 port = 3 |

FIG. 10 and Table 2 show that channels ch2 through ch5 need no reception changes during the hour for subscribers. In addition to the 15 minutes per channel preview periods shown in FIG. 10, Table 2 describes a continuous preview channel for previewers. This preview channel is received by hopping from the IP addresses of one channel to the IP addresses of another, at the times when the unencrypted content key of one channel expires and the unencrypted content key of the other channel becomes available.

Thus, the ESG outlined in Table 2, which is broadcast to terminals, describes five TV services that are each broadcast over a separate channels. In DVB-H networks, these separate channels may be transmitted at different timeslices. In addition, the ESG describes a "preview TV" service, which is a logical entity rather than a physical entity. This is because this service does not have its own dedicated channel (e.g., a dedicated DVB-H timeslice). Instead, this service provides extracts from each of the five existing channels.

FIG. 10B shows an exemplary transmission scheme in which DRM clients of previewer terminals receive ROs having rules associated with preview rights keys. As described above, DRM clients may receive an SA including a rights key identifier and a corresponding rights key. Alternatively, previewer terminals may receive ROs including information denoted as [p, RKp, "10 times for 5 minutes"]. In this notation, p is a preview rights identifier, RKp is a corresponding preview rights key, and "10 times for 5 minutes" is a usage rule for the preview rights key. Thus the preview rights key RKp may be used no more than 10 times, and not exceeding 5 minutes at a time.

Previewers are granted new preview ROs according to a policy, such as upon request. However, granting limits may be imposed, such no more than once per week. Such policies can be enforced by further information in each preview RO.

The transmission scheme shown in FIG. 10B is similar to the scheme of FIG. 10A. However, in FIG. 10B, the fixed preview periods described above are complemented with freely selectable preview periods option through broadcast upgrades to channels ch2, . . . ,ch5. In particular, encrypted content keys that can be decrypted with preview rights keys are transmitted. These encrypted content keys are shown in FIG. 10B as RKp(CKichn) (e.g., RKp(CK4ch5)). Thus holders of the preview RO, whose terminals can make use of rights key RKp as constrained by the preview rule, can take freely selectable preview periods on channels ch2 and ch3 at any time, but at channels ch4 and ch5 during the first half an hour only.

VIII. Terminal Device

FIG. 11 is a block diagram showing a wireless communications device architecture, which may be used for terminals, such as terminal devices 120. This architecture includes a host 1102, a control interface 1104, a controller 1106, a security module 1107, a DVB-H radio 1108, a cellular radio 1110, and a short-range wireless radio 1124.

Host 1102 is responsible for functions involving user applications and higher protocol layers. Such applications and protocol layers may involve, for example, the rendering of multimedia content (such as television broadcasts) to users. Host 1102 exchanges information with controller 1106 across control interface 1104. This information may include commands received from host 1102, and information transmitted to host 1102. control interface 1104 defines a set of messages, which provide for this exchange of information.

Controller 1106 performs functions related to link set-up, security and control. These functions may involve communicating with remote devices according to one or more protocols (such as the Bluetooth link manager protocol). To perform these functions, such protocols provide messages, which are also referred to as protocol data units (PDUs). Controller 1106 exchanges these PDUs with corresponding controllers at remote devices. In addition, controller 1106 buffers and schedules data for transmission to other mesh network nodes.

FIG. 11 shows that controller 1106 is coupled to both DVB-H radio 1108, cellular radio 1110, and short-range wireless radio 1124. These radios are responsible for lower layer communications protocols. In particular, DVB-H radio 1108 is responsible for the reception of information broadcast across DVB-H networks, and cellular radio 1110 is responsible for the exchange of information (e.g., telephony, messaging, and data traffic) with remote devices across cellular networks. Short-range wireless radio 1124 is responsible for the exchange of information with remote devices across short-range networks.

FIG. 11 shows that DVB-H radio 1108 includes a link controller 1112, a DVB-H receiver 1114, and an antenna 1116. Link controller 1112 operates as an intermediary between controller 1106 and transceiver 1114. Link controller 1112 also performs baseband processing for received DVB-H transmissions, such as error correction decoding.

DVB-H receiver 1114 is coupled to an antenna 1116. Receiver 1114 includes electronics that allow the device architecture of FIG. 11 (in conjunction with antenna 1116) to receive wireless broadband DVB-H signals transmitted by remote devices. Such electronics include modulators, demodulators, amplifiers, and filters.

FIG. 11 shows that cellular radio 1110 includes a link controller 1118, a cellular transceiver 1120, and an antenna 1122. Link controller 1118 operates as an intermediary between controller 1106 and cellular transceiver 1120. Link controller 1118 also performs baseband processing for cellular transmissions. Such processing may include such as error correction encoding and decoding, synchronization with GSM time division multiple access frames, and the formation of packets.

Cellular transceiver 1120 is coupled to antenna 1122. Cellular transceiver 1120 includes electronics, such as modulators, demodulators, amplifiers, and filters. Such electronics allow the device of FIG. 11, in conjunction with antenna 1122, to exchange (i.e., transmit and receive) wireless cellular signals with remote devices. Such signals may be in accordance with various cellular standards, such as GSM.

Short-range wireless radio 1124 provides for communications across one or more types of short-range networks, such as IEEE 802.11 wireless local area networks (WLANs) and/or Bluetooth networks. In addition, short-range wireless radio 1124 may provide for communications with radio frequency identification (RFID) tags. As shown in FIG. 11, short-range wireless radio 1124 includes a link controller 1126, a short-range transceiver 1128, and an antenna 1130. Link controller 1126 operates as an intermediary between controller 1106 and transceiver 1114. Link controller 1112 also performs baseband processing for short-range communications, such as error correction encoding and decoding.

Short-range transceiver 1128 is coupled to antenna 1130. Transceiver 1114 includes electronics that allow the device architecture of FIG. 11 (in conjunction with antenna 1116) to exchange wireless signals transmitted by remote devices. Such electronics include modulators, demodulators, amplifiers, and filters.

As shown in FIG. 11, security module 1107 is coupled to controller 1106. Security module 1107 may store material (i.e., information) related to encryption, such as keys, rights objects, and/or usage rules. In embodiments, such information is not accessible to other portions of the terminal device. Accordingly, security module 1107 may be a secure module, such as a DRM (e.g., an OMA DRM) client. Information contained in security module 1107 (such as OMA DRM ROs) may be obtained in various ways. For example, the information may be delivered via a cellular or mobile phone network through radio 1120 and controller 1106. Alternatively, this information may be downloaded from short-range encounters with remote devices (such as kiosks and/or access points) using short-range communications technologies, such as WLAN and Bluetooth.

Figure 12:
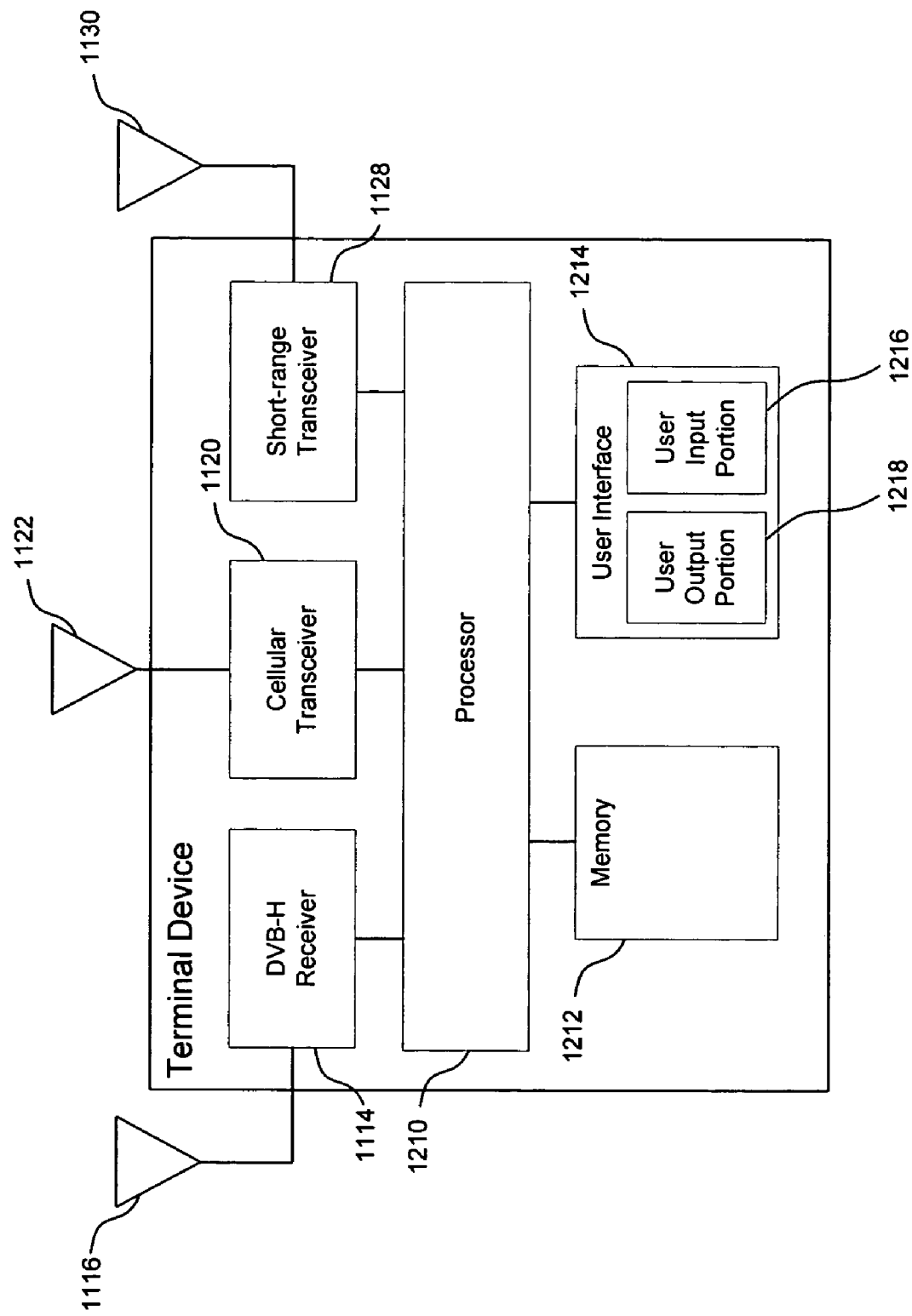
FIG. 12 is a diagram of an exemplary terminal device implementation.

Device architectures, such as the architecture of FIG. 11, may be implemented in hardware, software, firmware, or any combination thereof. One such implementation is shown in FIG. 12. This implementation includes a processor 1210, a memory 1212, and a user interface 1214. In addition, the implementation of FIG. 12 includes Bluetooth transceiver 1114, antenna 1116, UWB transceiver 1120, antenna 1122, short-range transceiver 1128, and antenna 1130. These components may be implemented as described above with reference to FIG. 11. However, as described above, the implementation of FIG. 12 may be modified to include different transceivers that support other wireless technologies.

Processor 1210 controls device operation. As shown in FIG. 12, processor 1210 is coupled to receiver 1114, and transceivers 1120 and 1128. Processor 1210 may be implemented with one or more microprocessors that are each capable of executing software instructions stored in memory 1212.

Memory 1212 includes random access memory (RAM), read only memory (ROM), and/or flash memory, and stores information in the form of data and software components (also referred to herein as modules). These software components include instructions that can be executed by processor 1210. Various types of software components may be stored in memory 1212. For instance, memory 1212 may store software components that control the operation of receiver 1114, transceiver 1120, and transceiver 1128. Also, memory 1212 may store software components that provide for the functionality of host 1102, control interface 1104, controller 1106, security module 1107, as well as link controllers 1112, 1118, and 1126.

In addition, memory 1212 may store software components that control the exchange of information through user interface 1214. As shown in FIG. 12, user interface 1214 is also coupled to processor 1210. User interface 1214 facilitates the exchange of information with a user. FIG. 12 shows that user interface 1214 includes a user input portion 1216 and a user output portion 1218.

User input portion 1216 may include one or more devices that allow a user to input information. Examples of such devices include keypads, touch screens, and microphones. User output portion 1218 allows a user to receive information from the device. Thus, user output portion 1218 may include various devices, such as a display, and one or more audio speakers (e.g., stereo speakers) and a audio processor and/or amplifier to drive the speakers. Exemplary displays include color liquid crystal displays (LCDs), and color video displays.

The elements shown in FIG. 12 may be coupled according to various techniques. One such technique involves coupling receiver 1114, transceivers 1120 and 1128, processor 1210, memory 1212, and user interface 1214 through one or more bus interfaces. In addition, each of these components is coupled to a power source, such as a removable and/or rechargeable battery pack (not shown).

Terminal devices, such as the devices described above with reference to FIGS. 11 and 12, may receive information transmitted according to the techniques described herein. For instance, terminal devices implemented according to the architecture of FIG. 11 may receive content items through DVB-H radio 1108. ESGs, rights keys, and ROs may be received through any one of radios 1108, 1110, or 1124.

For instance, embodiments, rights keys and ROs are transmitted (e.g., from a RO server) to terminal device(s) across cellular networks. Accordingly, such transmissions are received through cellular radio 1110. Moreover, obtaining such information (i.e., ROs and/or rights keys) may be arranged through communications involving cellular radio 1110, such as e-commerce transactions, across a cellular network. Similar communications may be performed across short-range network, thus involving short-range wireless radio 1124.

IX. Computer System

Figure 13:
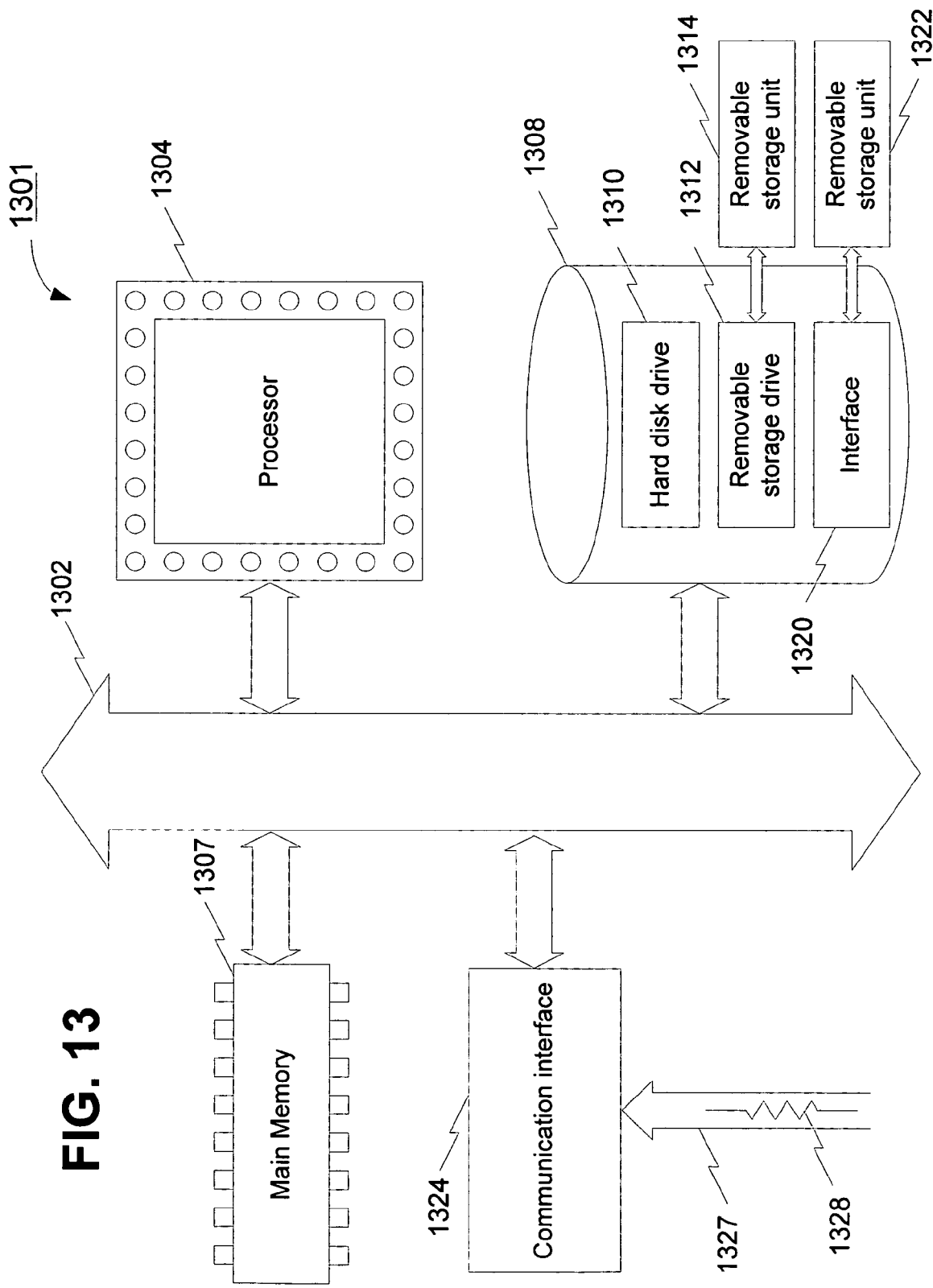
FIG. 13 is a diagram of an exemplary computer system.

The features of the present invention may be implemented with one or more computer systems. For example, computer systems may be used to implement techniques employed by content and ESG servers. An example of a computer system 1301 is shown in FIG. 13. Computer system 1301 represents any single or multi-processor computer. Single-threaded and multi-threaded computers can be used. Unified or distributed memory systems can be used.

Computer system 1301 includes one or more processors, such as processor 1304. One or more processors 1304 can execute software implementing the process described above ith reference to FIG. 4. Each processor 1304 is connected to a communication infrastructure 1302 (for example, a communications bus, cross-bar, or network). Various software embodiments are described in terms of this exemplary computer system. After reading this description, it will become apparent to a person skilled in the relevant art how to implement the invention using other computer systems and/or computer architectures.

Computer system 1301 also includes a main memory 1307 which is preferably random access memory (RAM). Computer system 1301 may also include a secondary memory 1308. Secondary memory 1308 may include, for example, a hard disk drive 1310 and/or a removable storage drive 1312, representing a floppy disk drive, a magnetic tape drive, an optical disk drive, etc. Removable storage drive 1312 reads from and/or writes to a removable storage unit 1314 in a well known manner. Removable storage unit 1314 represents a floppy disk, magnetic tape, optical disk, etc., which is read by and written to by removable storage drive 1312. As will be appreciated, the removable storage unit 1314 includes a computer usable storage medium having stored therein computer software and/or data.

In alternative embodiments, secondary memory 1308 may include other similar means for allowing computer programs or other instructions to be loaded into computer system 1301. Such means can include, for example, a removable storage unit 1322 and an interface 1320. Examples can include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1301.

Computer system 1301 may also include a communications interface 1324. Communications interface 1324 allows software and data to be transferred between computer system 1301 and external devices via communications path 1327. Examples of communications interface 1327 include a modem, a network interface (such as an Ethernet card), a communications port, etc. Software and data transferred via communications interface 1327 are in the form of signals 1328 which can be electronic, electromagnetic, optical or other signals capable of being received by communications interface 1324, via communications path 1327. Note that communications interface 1324 provides a means by which computer system 1301 can interface to a network such as the Internet.

The present invention can be implemented using software running (that is, executing) in an environment similar to that described above with respect to FIG. 13. In this document, the term "computer program product" is used to generally refer to removable storage units 1314 and 1322, a hard disk installed in hard disk drive 1310, or a signal carrying software over a communication path 1327 (wireless link or cable) to communication interface 1324. A computer useable medium can include magnetic media, optical media, or other recordable media, or media that transmits a carrier wave or other signal. These computer program products are means for providing software to computer system 1301.

Computer programs (also called computer control logic) are stored in main memory 1307 and/or secondary memory 1308. Computer programs can also be received via communications interface 1324. Such computer programs, when executed, enable the computer system 1301 to perform the features of the present invention as discussed herein. In particular, the computer programs, when executed, enable the processor 1304 to perform the features of the present invention. Accordingly, such computer programs represent controllers of the computer system 1301.

The present invention can be implemented as control logic in software, firmware, hardware or any combination thereof. In an embodiment where the invention is implemented using software, the software may be stored in a computer program product and loaded into computer system 1301 using removable storage drive 1312, hard drive 1310, or interface 1320. Alternatively, the computer program product may be downloaded to computer system 1301 over communications path 1327. The control logic (software), when executed by the one or more processors 1304, causes the processor(s) 1304 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

X. Conclusion

While various embodiments of the present invention have been described above, it should be understood that they have been presented by way of example only, and not in limitation. For instance, although examples have been described involving DVB-H technologies, other communications technologies are within the scope of the present invention.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
   designating one or more portions of a content item and previewing in intervals;
   generating in a first server an electronic service guide as meta data describing previews, content and other information regarding the one or more designated portions, and automatically informing consumers of previews and content via an electronic service guide channel;
   transmitting designated portions of the content in a plaintext form in transmission bursts occurring in first intervals in a first channel across a network;
   transmitting the remaining portions of the content item encrypted with a content key in transmission bursts occurring in second intervals in said first channel across the network;
   changing the content key in intervals throughout the transmission;
   transmitting encrypted content keys and associated rights keys in said second intervals in a second channel across the network;
   providing rights objects including the rights keys and rules in a second server that allows for content decryption and purchase of content rights in e-commerce transactions by consumers, and
   transmitting one or more rules across the network, the one or more rules placing use restrictions on one or more of said content keys via rights objects.

2. The method of claim 1, wherein step (a) comprises designating a time interval.

3. The method of claim 2, wherein the designated time interval is periodically occurring.

4. The method of claim 1, wherein the network is a digital video broadcast-handheld (DVB-H) network.

5. The method of claim 1, further comprising transmitting the electronic service guide across the network.

6. A method, comprising:
   designating one or more portions of a content item and previewing in intervals
   generating in a first server an electronic service guide as meta data describing previews, content and other information regarding the one or more designated portions, and automatically informing consumers of previews and content via an electronic service guide channel;
   transmitting the content item encrypted with a content key in transmission bursts occurring in intervals in a first channel across a network;
   changing the content keys in successive interval throughout the transmission;
   transmitting a plurality of content keys and associated rights keys across the network in an encrypted form in transmission bursts occurring in said intervals in a second channel, each of the plurality of keys for decrypting a corresponding portion of the content item;
   transmitting one or more of the plurality of content keys across the network in plaintext form, wherein the one or more of the plurality of keys correspond to the one or more designated portions of the content item;
   providing rights objects including the rights keys and rules in a second server that allows for content decryption and purchase of content rights in e-commerce transactions by consumers; and
   transmitting one or more preview rules across the network, the one or more preview rules placing use restrictions on one or more of said content keys via rights objects.

7. The method of claim 6, wherein step (a) comprises designating a time interval.

8. The method of claim 7, wherein the designated time interval is periodically occurring.

9. The method of claim 6, wherein the network is a digital video broadcast-handheld (DVB-H) network.

10. The method of claim 6, further comprising transmitting the electronic service guide across the network.

11. A method, comprising:
    transmitting a content item encrypted with a content key in transmission bursts occurring in intervals in a first channel across a network;
    changing the content key in successive intervals throughout the transmission;
    transmitting a plurality of content keys across the network in a first encrypted form in said intervals in a second channel, each of the plurality of keys for decrypting a corresponding portion of the content item;
    transmitting one or more of the plurality of content keys and associated rights keys across the network in a second encrypted form in a third channel;
    transmitting a subscriber rights key across the network for decrypting the plurality of content keys in the first encrypted form;
    transmitting a preview rights key across the network for decrypting the one or more content keys in the second encrypted form; and
    transmitting one or more preview rules across the network, the one or more preview rules placing use restrictions on said preview rights key.

12. The method of claim 11, further comprising:
    previewing one or more designated portions of a content item;
    wherein the one or more content keys in the second encrypted form correspond to the one or more designated portions of the content item.

13. The method of claim 12, wherein step (a) comprises designating a time interval.

14. The method of claim 13, wherein the designated time interval is periodically occurring.

15. The method of claim 11, wherein the network is a digital video broadcast-handheld (DVB-H) network.

16. The method of claim 11, further comprising transmitting the electronic service guide across the network.

17. A system, comprising:
an input configured to designate one or more portions of a content item and preview in intervals;
an electronic service guide server configured to generate an electronic service guide as meta data describing previews, content and other information regarding the one or more designated portions, and automatically inform consumers of previews and content via an electronic service guide channel;
a content server configured to transmit said one or more designated portions of the content in a plaintext form in transmission bursts occurring in first intervals in a first channel across a network;
said content server further configured to transmit the remaining portions of the content item encrypted with content key in transmission bursts occurring in second intervals in said first channel across the network,
a rights object server configured to change the content key in successive intervals throughout the transmission;
said rights object server further configured to transmit encrypted content keys in said second intervals in a second channel across the network;
said rights object server further configured to provide rights objects including the rights keys and rules in a second server that allows for content decryption and purchase of content rights by a consumer; and
said rights object server further configured to transmit one or more rules across the network, the one or more rules placing use restrictions on one or more of said content keys via rights objects.

18. A system, comprising:
an input configured to designate one or more portions of a content item and preview in intervals;
an electronic service guide server configured to generate an electronic service guide as meta data describing previews, content and other information regarding the one or more designated portions, and automatically informing consumers of previews and content via an electronic service guide channel;
a content server configured to transmit the content item encrypted with a content key in transmission burst occurring in intervals in a first channel across a network;
a rights object server configured to change the content key throughout the transmission;
said rights object server configured to transmit content keys in intervals corresponding to the first channel in a second channel;
said rights object server configured to transmit a plurality of content keys and associated rights keys across the network in an encrypted form in transmission burst occurring in said intervals in a third channel, each of the plurality of keys and decrypting a corresponding portion of the content item;
said rights object server configured to transmit one or more of the plurality of content keys across the network in plaintext form, wherein the one or more of the plurality of keys correspond to the one or more designated portions of the content item; and
said rights object server configured to provide rights objects including the rights keys and rules in a second server that allow for content decryption and purchase of content rights by consumers in e-commerce transactions; and
said rights object server configured to transmit one or more preview rules across the network, the one or more preview rules placing use restrictions on one or more of said content keys via rights objects.

19. A system, comprising:
a content server configured to transmit a content item encrypted with a content key in transmission burst occurring in intervals in a first channel across a network;
a rights object server configured to change the content key in successive intervals throughout the transmission;
said rights object server further configured to transmit a plurality of content keys across the network in a first encrypted form in said intervals in a second channel, each of the plurality of keys for decrypting a corresponding portion of the content item;
said rights object server further configured to transmit one or more of the plurality of content keys and associated rights keys across the network in a second encrypted form in a third channel;
said rights object server further configured to transmit the subscriber rights key across the network and decrypting the plurality of content keys in the first encrypted form;
said rights object server further configured to transmit a preview rights key across the network and decrypting the one or more content keys in the second encrypted form; and
said rights object server configured to transmit one or more preview rules across the network, the one or more preview rules placing use restrictions on said preview rights key.

20. A terminal device, comprising:
a terminal configured to receive from a first server an electronic service guide as meta data describing previews, content and other information regarding one or more designated portions, and automatically inform consumers of previews and content in an electronic service guide channel;
said terminal further configured to receive the one or more designated portions of the content item in a plaintext form in transmission bursts occurring in first intervals in a first channel;
said terminal further configured to receive the remaining portions of the content item encrypted with a content key in transmission bursts occurring in second intervals in said first channel;
said terminal further configured to receive encrypted content keys and associated rights keys in said second intervals in a second channel;
said terminal further configured to receive rights objects including the rights keys and rules in a second server that allows content decryption, and purchase of content rights by consumers in e-commerce transactions; and
said terminal further configured to receive one or more rules across the network, the one or more rules placing use restrictions on one or more of said content keys via rights objects.

21. A terminal device, comprising:
a terminal configured to receive from a first server an electronic service guide as meta data describing previews, content and other information regarding the one or more designated portions of a content item that are designated previewing, and automatically inform consumers of previews and content in an electronic service guide channel;

said terminal further configured to receive the content item encrypted with a content key in transmission bursts occurring in said intervals in a first channel;

said terminal further configured to receive a changed content key in successive intervals;

said terminal further configured to receive one or more content keys in plaintext form in said intervals in a second channel, wherein the one or more keys correspond to the one or more designated portions of the content item; and said terminal further configured to receive rights objects including the rights keys and rules in a second server that allows content decryption and purchase of content rights by consumers in e-commerce transactions; and said terminal further configured to receive one or more preview rules across the network, the one or more preview rules placing use restrictions on one or more of said content keys via rights objects.

22. The terminal device of claim 21, wherein the terminal further configured to receive the one or more content keys includes a transceiver configured to communicate across a cellular communications network.

23. The terminal device of claim 21, wherein the terminal further configured to receive the one or more content keys includes a transceiver configured to communicate across a short-range wireless communications network.

24. A terminal device comprising:
a terminal configured to receive a content item in an encrypted form in transmission bursts occurring in intervals in a first channel;

said terminal further configured to recieve a changed content key in successive intervals;

said terminal further configured to receive a plurality of content keys across the network in a first encrypted form in said intervals in a second channel, each of the plurality of keys decrypting a corresponding portion of the content item;

said terminal further configured to receive one or more of the plurality of content keys and associated rights keys and rules across the network in a second encrypted form in a third channel;

said terminal further configured to receive a preview rights key across the network decrypting the one or more content keys in the second encrypted form; and said terminal further configured to receive one or more preview rules across the network, the one or more preview rules placing use restrictions on said preview rights key.

25. The terminal device of claim 24, wherein the terminal further configured to receive the preview rights key includes a transceiver configured to communicate across a cellular communications network.

26. The terminal device of claim 24, wherein the terminal further configured to receive the preview rights key includes a transceiver configured to communicate across a short-range wireless communications network.

27. A system, comprising:
a streaming server providing content, encryption keys, rights keys in multiple channels;

a first server configured in a first channel to provide an electronic services guide as meta data describing previews, content, the electronic service guide having information regarding one or more portions of a content item that are designated previewing, and automatically informing consumers of previews and content via the first channel;

a second server configured to provide the one or more designated portions of the content item in a plaintext form in first intervals in the first channel and the remaining portions of the content item encrypted form with a content key in second intervals in said first channel and encrypted content keys and associated rights keys in said second intervals in a second channel, a third server configured to change the content key in successive intervals said second server configured to provide one or more rules, the one or more rules placing use restrictions on one or more of said content keys.

28. A system, comprising:
a streaming server providing content, encryption keys, rights keys in multiple channels;

a first server configured in a first channel to provide an electronic services guide as meta data describing previews, content, the electronic service guide having information regarding one or more portions of a content item that are designated for previewing and automatically informing consumers of previews and content via the first channel;

a second server configured to provide the content item encrypted with a content key in intervals in a second channel;

a third server configured to change the content key in successive intervals;

said third server configured in a third channel to provide one or more content keys in plaintext form and one or more keys in encrypted form in said intervals in a third channel;

wherein the one or more content keys in plaintext form decrypt the one or more designated portions of the content item, and the one or more content keys in encrypted form are the remaining portions of the content item; and said third server configured to provide one or more preview rules, the one or more preview rules placing use restrictions on one or more of said content keys.

* * * * *

UNITED STATES PATENT AND TRADEMARK OFFICE
CERTIFICATE OF CORRECTION

| | | |
|---|---|---|
| PATENT NO. | : 7,620,185 B2 | Page 1 of 1 |
| APPLICATION NO. | : 10/940631 | |
| DATED | : November 17, 2009 | |
| INVENTOR(S) | : Lahtinen et al. | |

It is certified that error appears in the above-identified patent and that said Letters Patent is hereby corrected as shown below:

COLUMN 22

Line 9 (claim 27), "electronic services guide" should read, --electronic service guide--;

Line 31 (claim 28), "electronic services guide" should read, --electronic service guide--.

Signed and Sealed this

Third Day of August, 2010

David J. Kappos
*Director of the United States Patent and Trademark Office*